United States Patent [19]
Mayerhofer

[11] Patent Number: 4,979,288
[45] Date of Patent: Dec. 25, 1990

[54] MEANS FOR THE MANUFACTURE OF ZIP FASTENERS

[75] Inventor: Friedrich Mayerhofer, Lengnau, Switzerland

[73] Assignee: First Tech, Arbon, Switzerland

[21] Appl. No.: 368,606

[22] Filed: Jun. 20, 1989

[30] Foreign Application Priority Data

Jul. 15, 1988 [EP] European Pat. Off. ........ 88810490.8

[51] Int. Cl.⁵ .............................................. B29D 5/10
[52] U.S. Cl. ........................................ 29/769; 29/767; 29/408; 29/410; 264/252; 425/814
[58] Field of Search .................... 264/252; 425/814; 29/408, 410, 766, 767, 769

[56] References Cited

U.S. PATENT DOCUMENTS

| | | | |
|---|---|---|---|
| 2,583,035 | 1/1952 | Winterhalter | 264/252 |
| 3,175,028 | 3/1965 | Waldes et al. | 264/252 |
| 4,627,807 | 12/1986 | Kuse | 425/814 |

FOREIGN PATENT DOCUMENTS

| | | |
|---|---|---|
| 1255024 | 1/1961 | France . |
| 2221261 | 10/1974 | France . |
| 2366114 | 4/1978 | France . |
| 282353 | 8/1952 | Switzerland . |
| 393725 | 11/1965 | Switzerland . |
| 626241 | 11/1981 | Switzerland . |
| 635026 | 3/1983 | Switzerland . |
| 662781 | 10/1987 | Switzerland . |

Primary Examiner—P. W. Echols
Attorney, Agent, or Firm—Marks Murase & White

[57] ABSTRACT

The process makes it possible to manufacture any zip fasteners, i.e. to mold sets of locking members of any length, of the staggered or slit type, the upper stop members, the coupling and the box in a single operation. The apparatus for injection moulding all these components comprises a two part injection moulding tool wherein strips with recesses for the forming of locking members are applied to both the lower and the upper part of the tool and the lower strips can be moved vertically. The transverse slide has in addition to recesses for the upper stop members and the recess for the coupling a mold part for the box, in which is located a mold body which can be displaced within the plane of the slide. In order to form locking members with slits the lower part of the tool is provided with a device to remove the insert which forms the slit from the slit when the finished zip fastener member is removed.

16 Claims, 4 Drawing Sheets

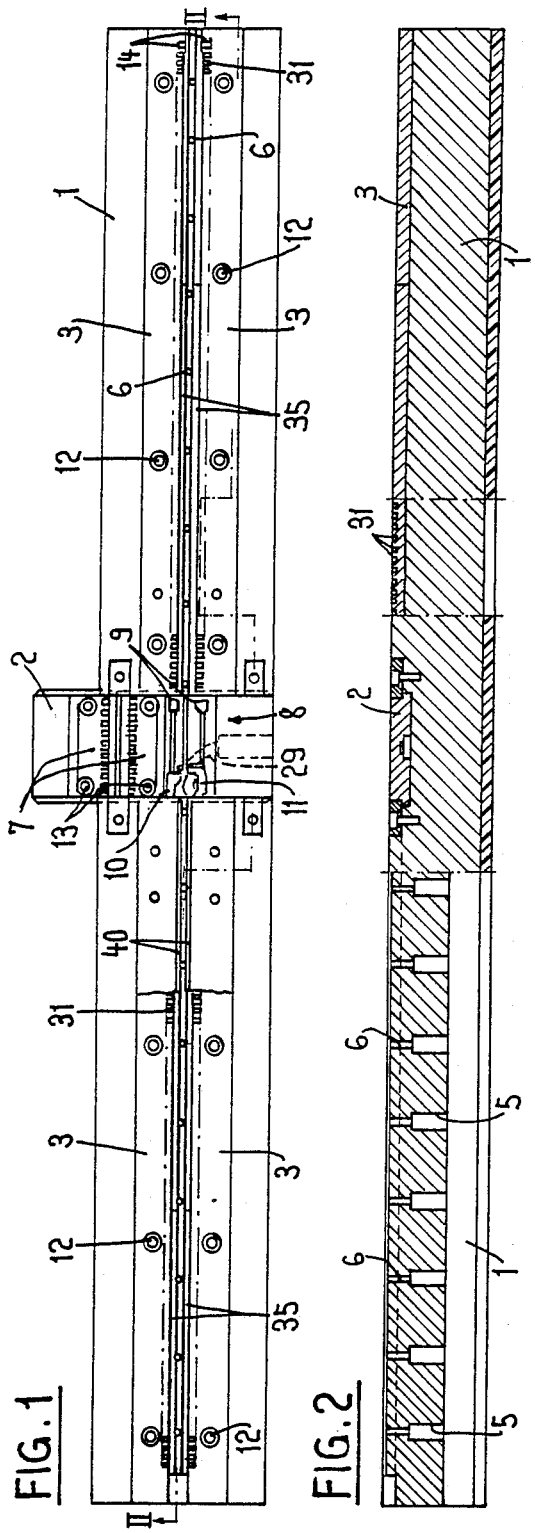
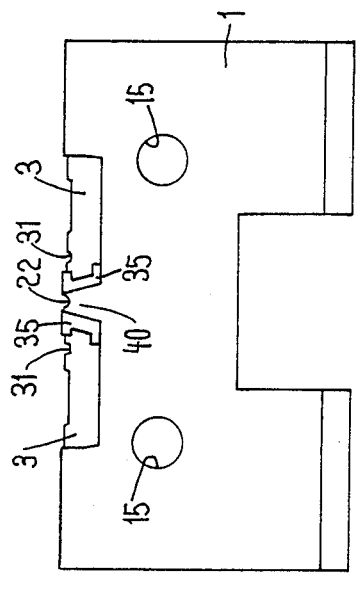

MEANS FOR THE MANUFACTURE OF ZIP FASTENERS

BACKGROUND OF THE INVENTION

This invention relates to a process for the manufacture of zip fasteners from textile supporting tapes with sets of injection molded locking members and means for implementing the process. A process and means of this kind are described in CH-A-635 026 which discloses as the principal component a transverse slide whereby both the locking members with the upper stopping members and the end members are manufactured in a single injection molding process using the same molding tool together with a center portion of any length. This process and means represented a technical advance over the prior art since previously the end members had to be injection molded separately and applied. However with the process and means according to this patent it is not possible to mold the box as well, and in accordance with CH-A-626 241 this is manufactured separately and connected to one of the end members of the previously mentioned patent using a connector. Separate manufacture of the box and its connection with the connector requires further process steps and is therefore cost intensive.

Also there are in the main two types of zip fasteners on the market, namely a type with staggered members in which each member consists of two teeth offsetting each other on the two sides of the textile tape, and a so-called slit-teeth type in which the member is of one piece and located on both sides of the textile tape and in which a slit is provided in the front side of the other member. According to the known state of the art this slit is milled subsequently using special tools with the result that the wear on precise and expensive tools is very great.

SUMMARY OF THE INVENTION

On the basis of this state of the art the object of this invention is to provide a process and means for the manufacture of zip fasteners whereby all the members of a zip fastener and its parts, in particular the end parts, can be injection molded with one tool and in one operation regardless of the type of zip. Another object is in particular to injection mold a zip fastener completely with a single tool in a single operation. This object is achieved by virtue of a process and means in accordance with the patent claims.

The invention is more particularly described below with reference to a drawing of specimen embodiments.

BRIEF DESCRIPTION OF THE DRAWINGS

FIG. 1 shows the lower part of an injection molding tool of the means according to the invention in plan view and in partly diagrammatical form, FIG. 2 shows a longitudinal cross-section along the line II—II in FIG. 1, FIG. 3 shows a view from the left hand side of FIG. 1.

DESCRIPTION OF THE PREFERRED EMBODIMENTS

Figure 4:
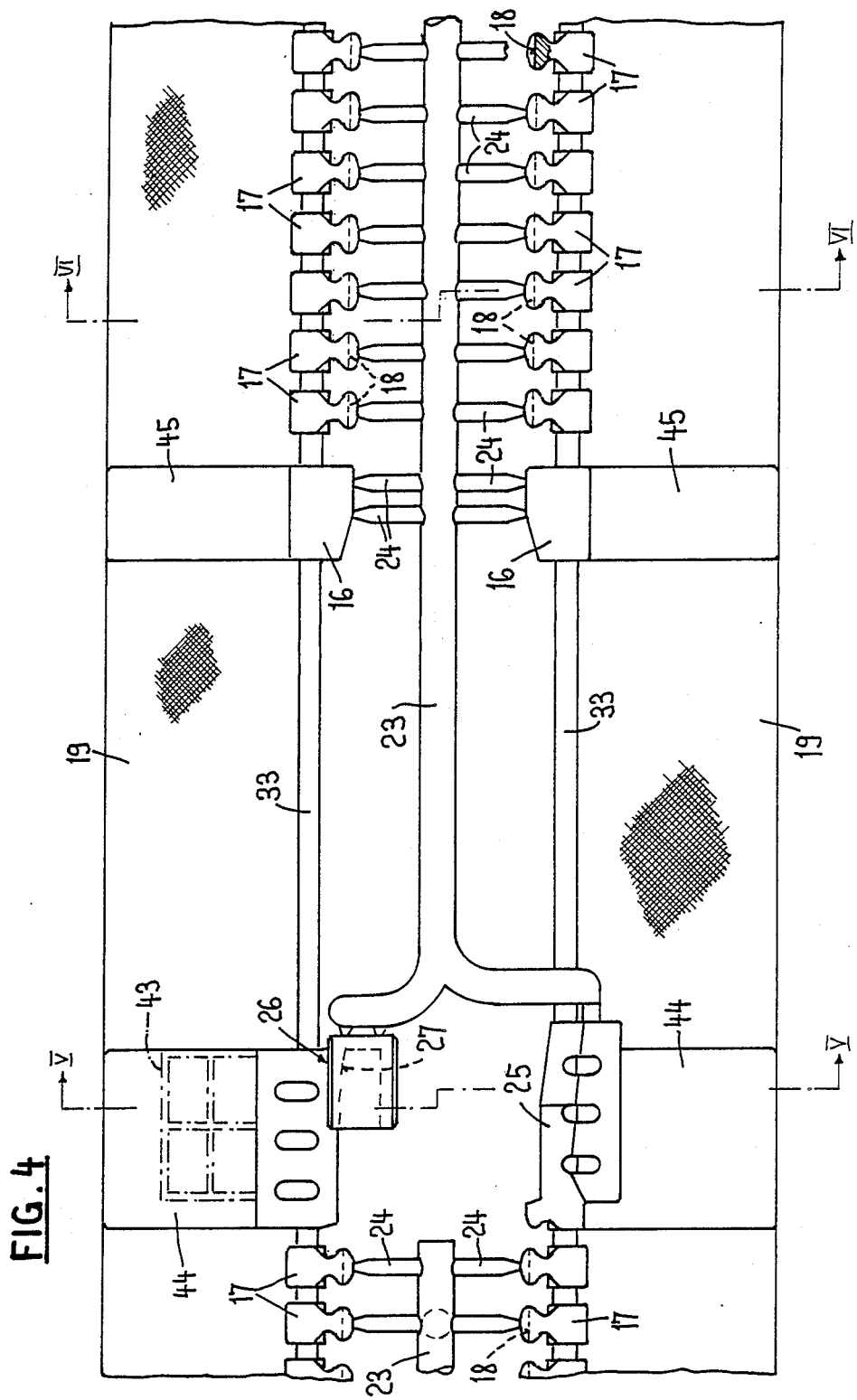
FIG. 4 shows the central portion with the upper and lower end members of a zip fastener injection molded with the injection molding tool and FIGS. 5 + 6 show cross-sections through the tools in the positions indicated by lines V—V and VI—VI.

Some parts of the injection molding tool and the base of the injection molding tool of the means in accordance with the invention are illustrated in FIGS. 1 and 2. These show the tool body 1 of the base, the lower transverse slide member 2, which is located approximately in the center, strips 3 screwed to tool body 1 and holes 5 and 6 in the body for ejector 4, see also FIG. 6. The ejector is operated by an ejector plate in a known way. Two screwed strips 7 and an end member 8 are located on transverse slide member 2 in the upper part of the drawing, with two depressions 9 for the upper stop members on the right side of the drawing and opposite to this on the left side of the drawing a recess 10 for forming the coupling and a mold 11 for forming the box. The strips are screwed to tool body 1 by means of screws 12. Transverse slide member 2 is likewise screwed to the tool body using screws 13.

In addition to mold 11 for the box, which will be described in greater detail below, there is another major difference from the known state of the art in that recesses 31 for the interlocking members and the corresponding end pieces are not formed directly in the tool body but are formed in removable and exchangeable strips. This not only has the advantage that different types of members can be injection molded using the same tool, but also a further major advantage that hardened and torsionally rigid strips can be used which can be oriented precisely on the tool body with the result that considerably longer tools can be manufactured with sufficient accuracy than is possible in the present state of the art. In fact tools of a length of 650 to 700 mm can be manufactured without any special measures being necessary in order to achieve the necessary precision. The two ends, on the right side of FIG. 1, of the strips have an end recess 14 in order to assist the first member of the zip fastener member first molded to hang there and then mold either only zip fastener members or the upper stop member when the transverse slide is displaced into the other position which is not shown.

In addition to the two strips 3 FIG., 3 shows two longitudinal holes 15 which serve to maintain the tool at a particular temperature by means of a suitable medium, and longitudinal slot 22 which forms the main channel.

FIG. 4 shows the central part of a zip fastener caster, on a magnified scale, as it is briefly before the tool is removed. On the right side are located the two upper stop members 16 with the directly connecting members 17, wherein members of the slit type are shown here, in which slit 18 is formed. The stop members and the other members are secured on both sides of textile tape 19. The plastic is injection molded from the top, i.e. through the upper tool body 20 illustrated in FIG. 6 which also shows the main feed 21 which opens into longitudinal slot 22, (see FIG. 3) between the two strips, which forms the main length 23 from which channels 24 branch off to the separate members. FIG. 4 also shows that all four end members are cast together with the individual zip fastener member on the right side of the drawing.

Although injection molding of the upper stop member and coupling piece 25 offers no special problems, since only recesses in the tool, or the strips, are necessary, simultaneous molding of box 26 obviously raises such difficulties that this has hitherto not appeared to be possible, because the box requires a body (shown by means of dashed lines in FIG. 4) 27, which cannot be removed upwards or downwards like the parts of the tool. The solution to this problem can be seen in FIG. 1 and the cross-section in FIG. 5. Body 27 which forms the box is connected via an arm 28 with a quarter-circle-shaped rammer 30 which runs in a correspondingly curved groove 29 in slide member 2 and is mechanically operated from the back towards the front in FIG. 5. Rammer 30 is secured to arm 28 by means of a screw 32.

Figure 5:
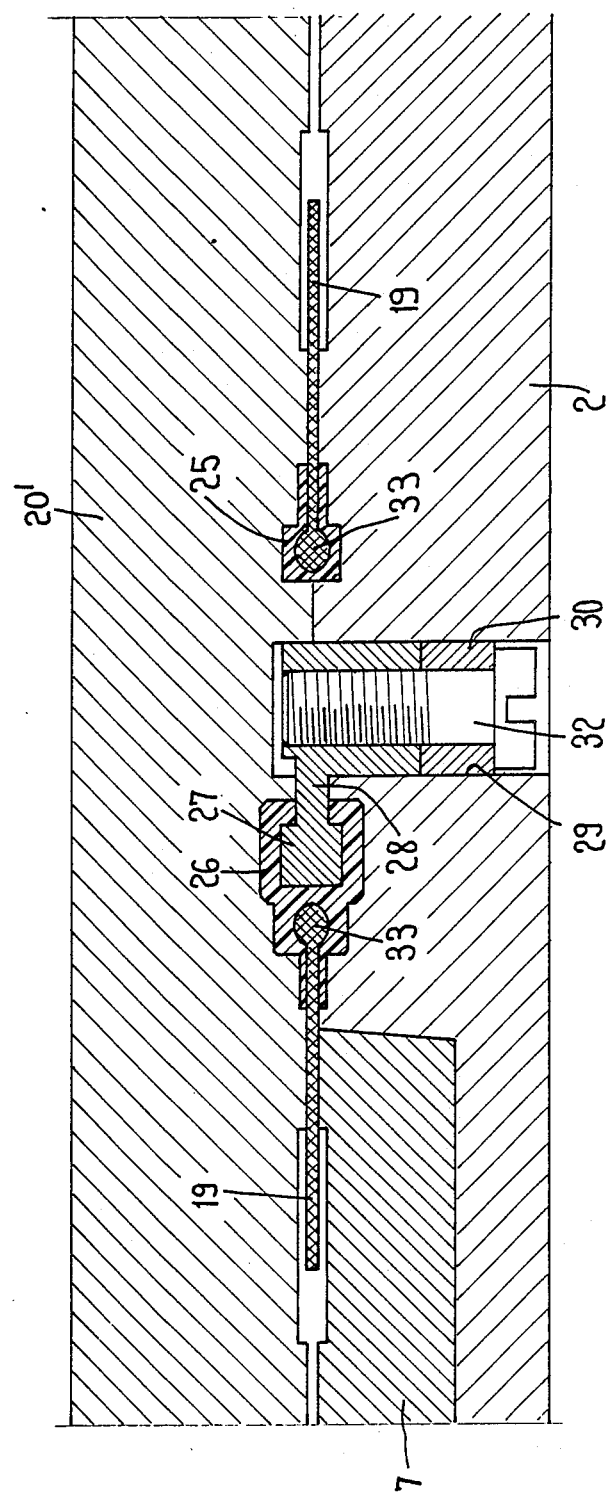

FIG. 5 also shows the other already described components such as textile tape 19, box 26, coupling piece 25, and it can also be seen that the textile tape has as usual a thickening 33 on its inner edges; and also upper tool body. It is also known and shown in FIG. 5 that upper tool portion is constructed in the same way as lower portion 2 with the exception of the ejector in the lower part and the channels for the plastic in the upper part. A further difference between the lower and upper parts lies in the upper part of the slide 20' which has no strips, only the corresponding hollows and recesses for the members and the end portions.

Figure 6:
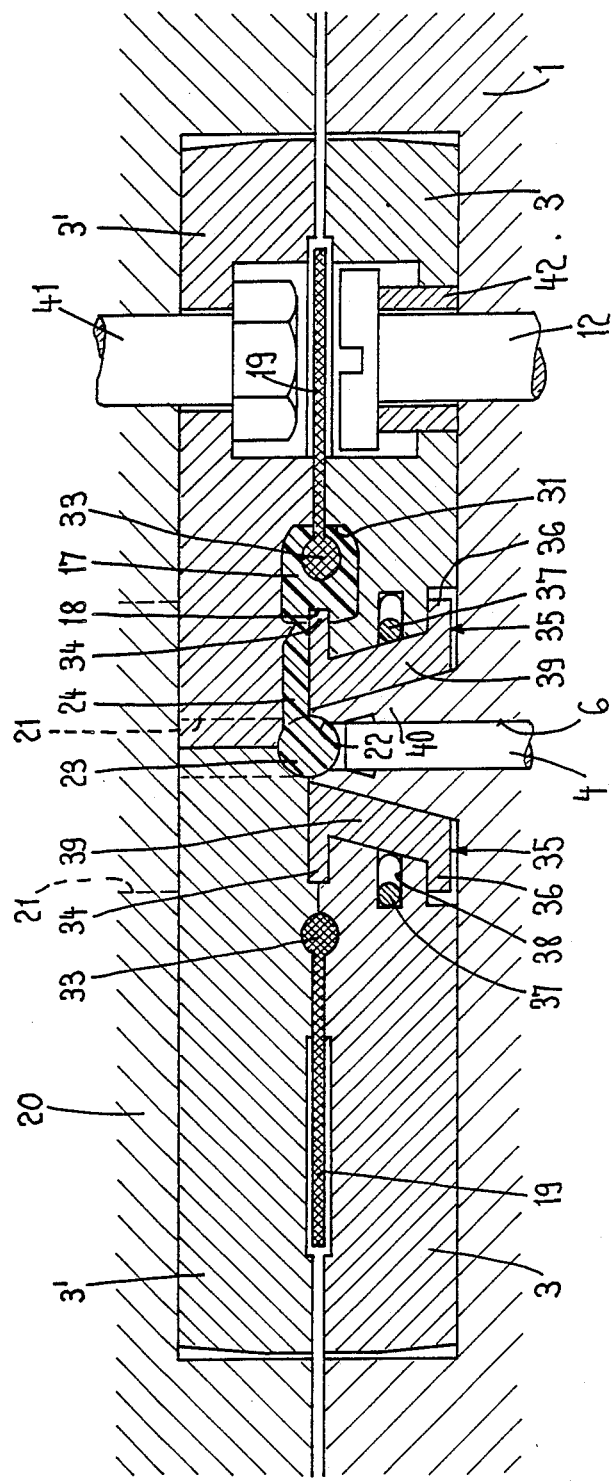

The parts, means and advantages so far described apply to all types of zip fasteners, i.e. the staggered or the slit types. As already mentioned in the introduction, it was not possible in the known state of the art to mold members of the slit type in one operation and it was in fact necessary to mold members without a slit in order that they could then be subsequently machined in a special machine, i.e. to cut out the slit. FIG. 6 also shows why the molding of slit members in a multiple tool gives rise to major difficulties, because as in the case of the box, the inserted piece which forms the slit cannot be removed from above or beneath, but only from the side. As will be seen from the following description, the solution to this problem is achieved in that the recesses for the members are not located directly in the parts of the tool, but in strips. As mentioned the injection of slit members requires a lateral movement of inserts 34, which form slit 18 in member 17. Insert 34 is a short limb of a U-shaped insert 35 which is movably mounted in strip 3 wherein upper limb 34, i.e. the insert, and lower limb 36 guide the insert strip. At approximately the center, pressure is applied to the insert strip by means of a compression spring 37 which is housed in a recess 38 in the strip in such a way that this is pressed out against the center, i.e. out of the slit. The two long limbs 39 of the insert strip are inclined together and are supported on a frustoconical longitudinal strip 40 which is formed in a single piece with lower tool body 1. In the closed position shown here shortly after molding of the members and before their ejection, this longitudinal strip supports insert strip 35 and thus insert 34.

In the known state of the art, the upper part of the mold is removed after molding and the molded zip fastener member is removed by ejector 4 as shown in FIG. 6. In the case of the tool construction as shown, the ejector does not only eject the molded zip fastener members upwards, but also pushes strips 3 with them over insert strip 35. While the upper strips 3' are fixed to upper tool body 20 by means of screws 41 strips 3 are attached to lower tool body 1 by means of screws 12 in such a way that strips 3 can move outwards and upwards. For this purpose sleeves 42 on which strips 3 are guided are placed around screws 12. When the zip fastener members are ejected together with insert strips 35 attached to them these are raised by frustoconical longitudinal strip 40 and assist compression spring 37 to eject the insert strips and their insert 34 from the slit 18 of members 17 and thus release the zip fastener member. By this means strips 3 fall back into their original positions. As is known from the state of the art the ejector is as a rule operated by an ejector plate, the ejector in the lower transverse slide member having to be of a different design from the ejector for the other parts, i.e. in two portions and with a return spring in the slide portion.

The above description shows that all types of zip fastener members and all their components can be molded in one operation with the tool described, whereas previously several operations were necessary for this, in particular time-consuming and cost-intensive operations in order to manufacture the slit for the zip fastener or to manufacture the box separately and fit it.

Further simplifications can be applied at the ends. In accordance with the state of the art it is usual, as shown at the top of FIG. 4, to mold so-called "butterflies" 43, i.e. lattices of plastic, in order to strengthen this region. Instead of this it is also possible to provide a reinforcing strip 44 which can be applied to appropriate places before the tape is placed in the tool in order to strengthen weak points. With this process it is also possible to apply narrow reinforcing strips 45 to the upper stop members. As textile tape 19 is fed continuously into the tool from a roll the reinforcing strips can be applied automatically in advance, preferably by means of ultrasonic welding.

In order to increase the economy and service life of the tool the strips can be manufactured from hard metal or hardened steel or be provided with a very hard coating of metal or steel by means of known coating processes so that they have both low friction and reduced adherence to plastic in order to aid removal of the molded zip fastener members.

The method of working can be seen in FIG. 4. Here the right zip fastener member is either an overmolding, i.e. the first molding, or an already cast component with end members 25 and 26. After molding, the upper part of the tool is removed, the zip fastener member is ejected and in this particular case transported to the right. After this, either the upper stop member 16 is molded or the transverse slide member is placed in the other position in order to mold only locking members, it being possible for this process to be repeated in the case of specially long zips or upper stop member 16 and the lower end pieces 25 and 26 to be molded subsequently with the corresponding members. The process operates fully automatically and is controlled by appropriate electronics which can be manufactured and designed by one skilled in the art. Because the strips are exchangeable it is possible to manufacture all zip fasteners known on the market, for example, with appropriate modification of the transverse slide, zip fasteners with an open or closed end, i.e. separable or unseparable end members, or double open or continuous zip fasteners of the two above-mentioned types or other types of fastener. For this only the corresponding parts of the transverse slide member need to be replaced.

In addition to this the injection molded tool constructed on the modular system offers the user not only the possibility of selecting and combining different zip types, but also convenient exchangeability, rapid insertion for different sizes of member and the rapid replacement of individual strips which have become damaged by wear or otherwise.

In addition to this spacing wedges may be inserted on one or both sides in order to determine the length.

What I claim:

1. An injection molding apparatus comprising:
   a base having a top part with two recesses and a longitudinal axis, the recesses extending along the longitudinal axis;
   a first set of two base strips and a second set of two base strips detachably secured to the base in the recesses, both sets having indentations for forming interlocking members on a first and second textile tape positioned on top of said base strips;
   a transverse slide member positioned between said first set of base strips and said second set of base strips and connected to said base, said transverse slide member having a first portion and a second portion, with a first and a second side on the second portion, and comprising:
   two screwed strips parallel to said base strips having indentations for forming interlocking members on the first portion of said transverse slide member;
   means for forming a coupling and a box on the first textile tape positioned on the first side of the second portion of said transverse slide member;
   means for forming a coupling on the second textile tape adjacent to said means for forming a coupling and a box, also on the first side of the second portion of said transverse slide member; and
   means for forming upper stop members on the textile tapes, said means for forming upper stop members positioned on the second side of the second portion of said transverse slide member;
   said transverse slide member capable of being in a first working position when said two screwed strips are aligned with said base strips and said transverse slide member capable of being in a second working position when said means for forming a coupling and a box, a coupling and upper stop members are aligned with said base strips; and
   a top reciprocal with said base and said transverse slide member.

2. The injection molding apparatus of claim 1, wherein said base strips are secured to said base by screws.

3. The injection molding apparatus of claim 1, wherein said base strips and screwed strips are made of hardened steel.

4. The injection molding apparatus of claim 1, wherein said base strips and screwed strips have a coating of hard metal.

5. The injection molding apparatus of claim 1, wherein said base strips and screwed strips have a coating of hard steel.

6. The injection molding apparatus of claim 1, wherein said apparatus is capable of forming interlocking members on textile tapes of variable lengths.

7. The injection molding apparatus of claim 1, wherein the base strips form interlocking members of the staggered type.

8. The injection molding apparatus of claim 1, wherein the base strips form interlocking members of the slit type.

9. An injection molding apparatus as in claim 1, wherein the base strips of said second set of base strips have first ends and second ends, the first ends being adjacent to said transverse slide member and the second ends being distant from said transverse slide member, the second ends having end recesses.

10. An injection molding apparatus as in claim 1, wherein said apparatus may be maintained at a particular temperature by a suitable medium placed in two longitudinal holes in said base.

11. An injection molding apparatus as in claim 1, wherein the top of said base further comprises a slot positioned between the base strips of the first set of base strips and a slot positioned between the base strips of the second set of base strips.

12. An injection molding apparatus as in claim 11, wherein said apparatus further comprises at least one substantially vertical tube extending through said top so as to introduce a plastic material into said slot.

13. An injection molding apparatus as in claim 11, further comprising a plurality of substantially horizontal channels extending from said slots to the indentations of said base strips for introducing a plastic material to the base strips for forming the interlocking members.

14. An injection molding apparatus as in claim 11, wherein said means for forming a coupling and a box and said means for forming a coupling further comprise:
   plastic material introduction means cooperating with said slot and positioned between the first and second textile tapes;
   mold means for forming a coupling located along said second textile tape, said mold means for forming a coupling cooperating with said plastic material introduction means; and
   mold means for forming a coupling and a box located along said first textile tape, said mold means for forming a coupling and a box cooperating with said plastic material introduction means.

15. An injection molding apparatus as in claim 14, wherein said mold means for forming a box and a coupling further comprises:
   connecting means for connecting a box and a coupling to the first textile tape;
   body forming means for forming the interior of said box, said body forming means being adjacent to said connecting means; and
   body support means for supporting said body forming means, said body support means being adjacent to said body forming means.

16. An injection molding apparatus as in claim 15, wherein said body support means comprises:
   an arm connected to said body forming means;
   a quarter circle rammer adapted to rotate in a substantially vertical annular groove in said transverse slide member and positioned directly below said arm; and
   a screw extending through said rammer and said arm so as to connect said rammer with said arm.

* * * * *